United States Patent
Ozawa et al.

(10) Patent No.: US 8,371,334 B2
(45) Date of Patent: Feb. 12, 2013

(54) ROTARY SWITCHING VALVE

(75) Inventors: Yukio Ozawa, Kasugai (JP); Takashi Yajima, Kasugai (JP); Tsuneyuki Okabe, Oshu (JP); Shigeyuki Okura, Nirasaki (JP)

(73) Assignees: CKD Corporation, Komaki (JP); Tokyo Electron Limited, Tokyo (JP)

( * ) Notice: Subject to any disclaimer, the term of this patent is extended or adjusted under 35 U.S.C. 154(b) by 385 days.

(21) Appl. No.: 12/712,609

(22) Filed: Feb. 25, 2010

(65) Prior Publication Data
US 2010/0229984 A1    Sep. 16, 2010

(30) Foreign Application Priority Data

Mar. 16, 2009  (JP) .................................. 2009-063062

(51) Int. Cl.
*F16K 11/085*  (2006.01)
(52) U.S. Cl. ...................... 137/625.47; 137/246; 137/563
(58) Field of Classification Search ............. 137/625.16, 137/625.47, 246, 563
See application file for complete search history.

(56) References Cited

U.S. PATENT DOCUMENTS

| 1,926,790 A | * | 9/1933 | Ploen | 137/557 |
| 3,034,528 A | * | 5/1962 | Wharff, Jr. | 137/246.22 |
| 4,372,338 A | * | 2/1983 | Efferson | 137/240 |
| 4,564,043 A | * | 1/1986 | Trittler | 137/624.18 |
| 5,375,622 A | * | 12/1994 | Houston | 137/240 |
| 5,465,748 A | * | 11/1995 | Bowers | 137/240 |
| 5,901,737 A | * | 5/1999 | Yaron | 137/246.12 |

FOREIGN PATENT DOCUMENTS

| JP | U-04-041170 | 4/1992 |
| JP | U-05-47634 | 6/1993 |
| JP | A-6-45256 | 2/1994 |
| JP | A-11-87341 | 3/1999 |
| JP | A-200845669 | 2/2008 |

OTHER PUBLICATIONS

Oct. 30, 2012 Office Action issued in Japanese Patent Application No. 2009-063062 (with translation).

* cited by examiner

*Primary Examiner* — John Fox
(74) *Attorney, Agent, or Firm* — Oliff & Berridge, PLC

(57) ABSTRACT

A rotary valve (1) includes a valve body (2) formed with a chamber communication passage (24) for flowing a main fluid and a vent communication passage (25) for discharging the main fluid and a cylindrical valve member (3) rotatably held in the valve body (2) and formed with a main passage (31) for flowing the main fluid. The cylindrical valve member (3) is rotated to switch the connection of the main passage (31) between the chamber communication passage (24) and the vent communication passage (25). The rotary switching valve (1) further includes a purge gas passage for passing purge gas in a clearance (11) between the valve body (2) and the cylindrical valve member (3), the purge gas being supplied to the clearance (11) to prevent the main fluid from leaking out of the main passage (31).

10 Claims, 13 Drawing Sheets

ROTARY SWITCHING VALVE

CROSS-REFERENCE TO RELATED APPLICATIONS

This application is based upon and claims the benefit of priority from the prior Japanese Patent Application No. 2009-063062 filed on Mar. 16, 2009, the entire contents of which are incorporated herein by reference.

TECHNICAL FIELD

The present invention relates to a rotary switching valve including: a valve body formed with a chamber communication passage for flowing a main fluid and a vent communication passage for discharging the main fluid, the passages being arranged on a pipe that connects a process gas supply device and a chamber (reaction chamber); and a cylindrical valve member rotatably held in the valve body and formed inside with a main passage for flowing the main fluid, the cylindrical valve member being rotated to selectively connect the main passage to at least one of the chamber communication passage and the vent communication passage.

BACKGROUND ART

In relation to a semiconductor manufacturing device for forming a thin film, it is required to control process gas yielded as a main fluid by vaporizing a liquid at 250° C. or more. For flowing the process gas yielded by vaporizing the liquid at 250° C. or more while controlling to maintain the temperature of 250° C. or more, a resin valve having a resin valve seat and a resin diaphragm can not be used. Heretofore, three poppet valves are used to connect three passages by metal-to-metal contact between a metal valve seat and a metal diaphragm.

However, the three poppet valves connected by the metal contact have a problem that connecting portions could wear due to repetition of the metal contact action. The wear causes leakage of the process gas and generation of abrasion powder that contaminates the chamber, thus shortening lifetime of the switching valve.

On the other hand, another conventional technique of a switching valve utilizing purge gas instead of the metal contact connection is disclosed as a rotary switching valve in Patent Literature 1.

The rotary switching valve in Patent Literature 1 includes: a valve body formed with a main passage for flowing a main fluid; and a cylindrical valve member rotatably held in the valve body and formed inside with a main passage. The cylindrical valve member is rotated to switch the main passage. The rotary switching valve in Patent Literature 1 is used for air-transporting polyethylene, polypropylene, and others in a form of powder particles.

In the rotary switching valve of Patent Literature 1, purge gas is supplied into a clearance or gap between the valve body and the cylindrical valve member to air-transport the powder particles. The flowing purge gas flicks the powder particles before the powder particles flowing through the main passage in the cylindrical valve member are caught in the clearance between the valve body and the cylindrical valve member. The flowing purge gas can thus prevent the powder particles from becoming caught in the clearance between the valve body and the cylindrical valve member.

CITATION LIST

Patent Literature

Patent Literature 1: JP2008-45669A
Patent Literature 2: JP06 (1994)-45256A
Patent Literature 3: JP11 (1999)-87341A

SUMMARY OF INVENTION

Technical Problem

However, when the rotary switching valve of Patent Literature 1 is used to control the process gas yielded by vaporizing a liquid at 250° C. or more in a semiconductor manufacturing device for producing a thin film, the following problems are caused.

In the rotary switching valve in Patent Literature 1, a large amount of purge gas has to be supplied enough to prevent powder particles from becoming caught in the clearance. However, in a semiconductor manufacturing device in which a large amount of purge gas is supplied, the purge gas may mix with the process gas. When the purge gas mixes with the process gas, characteristics (concentration) of the process gas is changed, thereby influencing the performance of a semiconductor as a final product.

On the other hand, when a flow rate of the purge gas is too little for the purpose of preventing mixture of the purge gas with the process gas, there is also a problem, that the process gas could leak out to the clearance between the valve body and the cylindrical valve member.

Further, Patent Literatures do not mention a configuration to prevent wear powder due to the contact between a valve body and a cylindrical valve member at 250° C. or more.

The present invention has been made to solve the above problems and has a purpose to provide a rotary switching valve capable of preventing leakage of process gas through a clearance between a valve body and a cylindrical valve member, preventing generation of wear powder, and enabling the purge gas to flow not to cause leakage of the process gas through the clearance between the valve body and the cylindrical valve member.

Solution to Problem

To achieve the above objectives, a rotary switching valve according to the present invention has the following configuration.

(1) A rotary switching valve includes: a valve body formed with a chamber communication passage for flowing a main fluid and a vent communication passage for discharging the main fluid; and a cylindrical valve member rotatably held in the valve body and formed with a main passage for flowing the main fluid, the cylindrical valve member being rotated to switch the connection of the main passage between the chamber communication passage and the vent communication passage, wherein the rotary switching valve includes a purge gas passage for passing purge gas in a clearance between the valve body and the cylindrical valve member, the purge gas being supplied to the clearance to prevent the main fluid from leaking out of the main passage.

Advantageous Effects of Invention

Operations and effects of the above rotary switching valve are explained below.

(1) In the rotary switching valve having the above configuration, for example, purge gas flows through a clearance between the valve body and the cylindrical valve member when the main fluid flows through the main passage in the cylindrical valve member. Thereby, the main fluid can be prevented from leaking in the clearance between the valve body and the cylindrical valve member.

DESCRIPTION OF EMBODIMENTS

A detailed description of a preferred embodiment of a rotary switching valve embodying the present invention will now be given referring to the accompanying drawings.

First Embodiment

Overall Configuration of a Rotary Switching Valve

Figure 1:
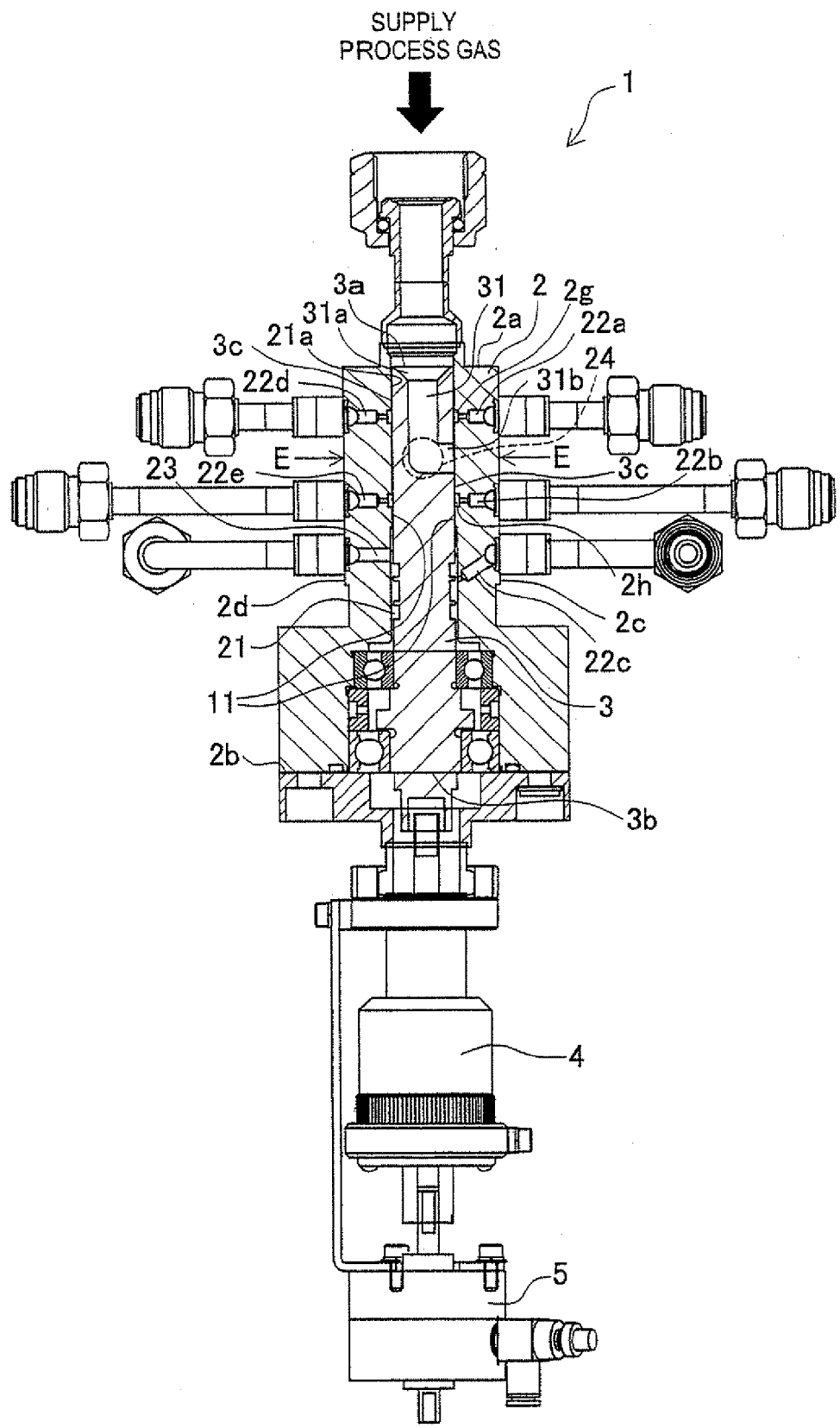
FIG. 1 is an externally partial sectional view of a rotary switching vale.

FIG. 1 shows an externally partial sectional view of a rotary switching valve 1.

The rotary switching valve 1 includes: a valve body 2 provided inside with a cylindrical valve member 3; the cylindrical valve member 3 rotatably held in the valve body 2 and formed inside with a main passage 31; a rotation introducing unit 4 to rotate the cylindrical valve member 3; and a rotary actuator 5 for applying energy to the rotation introduction member 4. FIG. 1 shows the inside of the valve body 2 in a longitudinal sectional view for better understanding of the configuration of the valve body 2 and the cylindrical valve member 3.

The cylindrical valve member 3 (hereinafter, simply referred to as valve member 3) is of almost cylindrical shape. The main passage 31 is formed in the valve member 3 for passing process gas as a main fluid. The main passage 31 vertically extends from an upper surface 3a of the valve member 3 toward a lower surface 3b and then turns at a right angle in the valve member 3 and opens in a peripheral wall surface 3c. Specifically, the main passage 31 has a process gas supply port 31a opening in the upper surface 3a and a process gas communication port 31b opening in the peripheral wall surface 3c.

Figure 6A:
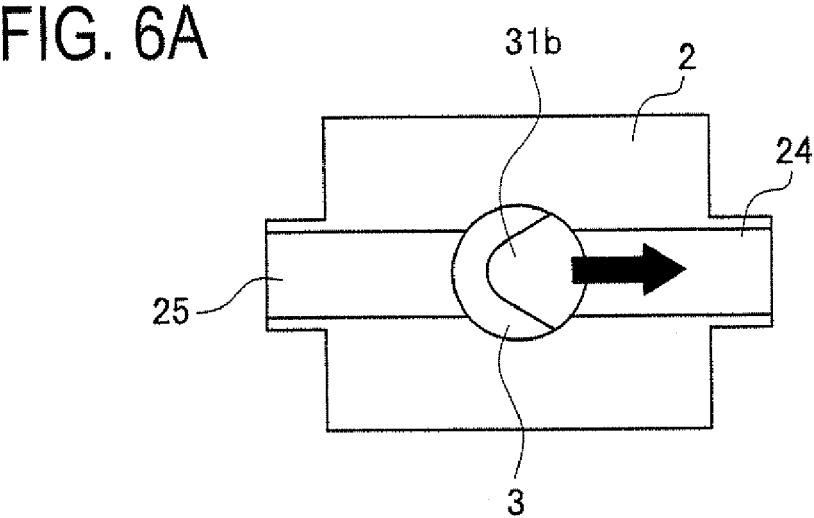
FIG. 6A is a cross sectional view taken along a line E-E in FIG. 1 showing a state that a process gas communication port is communicated with a chamber communication passage.
Figure 6B:
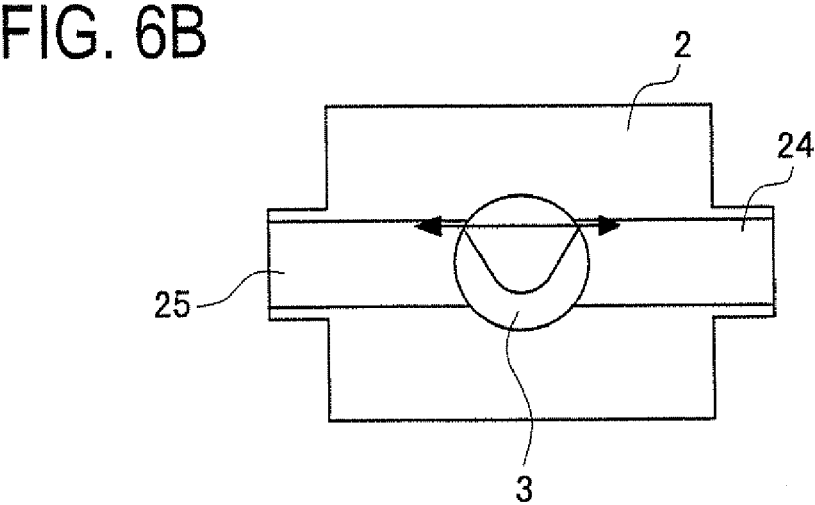
FIG. 6B is a cross sectional view taken along a line E-E in FIG. 1 showing a state that the process gas communication port is placed in a middle position between the chamber communication passage and a vent communication passage.
Figure 6C:
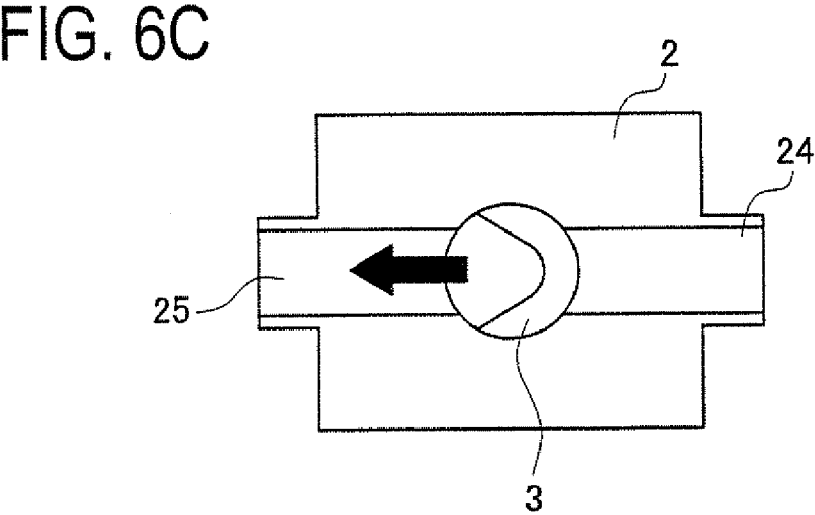
FIG. 6C is a cross sectional view taken along a line E-E in FIG. 1 showing a state that the process gas communication port is communicated with the vent communication passage.

FIGS. 6A to 6C show cross sectional views of the process gas communication port 31b, each figure taken along a line E-E in FIG. 1. The process gas communication port 31b is of a fan-like shape in cross section with a central angle of about 60 degrees. As shown in FIG. 6B, this fan-like cross section of the process gas communication port 31b provides fluid communication between a chamber communication passage 24 and a vent communication passage 25 even in a case that the process gas communication port 31b is in the middle position for switching from the chamber communication passage 24 to the vent communication passage 25. Therefore, as shown in FIGS. 6A to 6C, this fan-shaped process gas communication port 31b is continuously allowed to be communicated with the chamber communication passage 24 and the vent communication passage 25.

The valve body 2 is formed inside with an insertion hole 21 in which the cylindrical valve member 3 is inserted. The insertion hole 21 vertically extends through the valve body 2 from an upper surface 2a to a lower surface 2b. The valve body 2 is also formed with a purge gas annular passage 2g in an annular groove shape in the insertion hole 21 at a place to communicate with purge gas passages 22a and 22d. The valve body 2 is further formed with a purge gas annular passage 2h in an annular groove shape in the insertion hole 21 at a place to communicate with purge gas passages 22b and 22e.

In the valve body 2, the purge gas passages 22a and 22b are formed extending in a perpendicular direction to and an opening in a right side surface 2c. In the valve body 2, furthermore, a purge gas passage 22c is formed extending at an inclination angle of 60 degrees with respect to and opening in the right side surface 2c.

In the valve body 2, the purge gas passages 22d and 22e are formed extending in the perpendicular direction to and opening in the left side surface 2d.

The purge gas passages 22a and 22d are communicated with the insertion hole 21 via the purge gas annular passage 2g. The purge gas passages 22b and 22e are communicated with the insertion hole 21 via the purge gas annular passage 2h.

Below the purge gas passage 22e opening in the left side surface 2d of the valve body 2, a purge gas discharging passage 23 is formed extending in a perpendicular direction to and opening in the left side surface 2d. The purge gas discharging passage 23 is communicated with the insertion hole 21.

In the present embodiment, the purge gas passages 22a and 22d are formed on the side surface of the valve body 2 at a distance of 150 mm or less from a horizontal line of the upper surface 3a of the valve member 3. This value, 150 mm or less, is determined from test results based on the experiments which will be described later.

At the midpoint of the purge gas passages 22a and 22b in a longitudinal direction in FIG. 1, the chamber communication passage 24 and the vent communication passage 25 are formed. Each distance from the chamber communication passage 24 and the vent communication passage 25 to the purge gas passages 22a and 22b is 10 mm. Similarly, the chamber communication passage 24 and the vent communication passage 25 are formed at the midpoint of the purge gas passages 22d and 22e.

A clearance 11 having a distance of 25 to 100 μm is formed between an inner wall surface 21a of the insertion hole 21 with which the purge gas passages 22a, 22b, 22c, 22d, and 22e and the purge gas discharging passage 23 are communicated and the peripheral wall surface 3c of the cylindrical valve member 3.

The chamber communication passage 24 is formed in the valve body 2 to extend in a perpendicular direction to and open in the front side of the valve body 2, even though the front side does not appear in FIG. 1 showing the longitudinal section of the valve body 2. For indicating the position of the chamber communication passage 24, the chamber communication passage is shown with a broken line in FIG. 1. The vent communication passage 25 is formed extending in a perpendicular direction to and opening in the backside of the valve body 2, which is also not shown in the figure.

In a state shown in FIG. 1, the process gas communication port 31b of the valve member 3 is not directly communicated with the chamber communication passage 24 and the vent communication passage 25 in the valve body 2.

The rotation introducing unit 4 is engaged with the rotary actuator 5 and also engaged with the valve body 2.

Operations and Effects of the Rotary Switching Valve in the First Embodiment

Operations and effects of the rotary switching valve 1 will be explained below.

When process gas as a main fluid is to be supplied to a chamber, as shown in FIG. 6A, the process gas communication port 31b of the cylindrical valve member 3 is brought into communication with the chamber communication passage 24 of the valve body 2. Therein, the process gas is supplied from a process gas supply source. The thus supplied process gas flows through the main passage 31 of the valve member 3 and further flows to the chamber communication passage 24 through the process gas communication port 31b. At this time, the clearance 11 of 25 to 100 μm are formed between the inner wall surface 21a of the insertion hole 21 of the valve body 2 and the peripheral wall surface 3c of the valve member 3. Thus, the process gas leaks in the clearance 11 surrounding the process gas supply port 31a and the process gas communication port 31b.

On the other hand, in the present embodiment, during supply of the process gas, the purge gas is supplied to the valve body 2 through the purge gas passages 22a, 22b, 22c, 22d, and 22e so that the flow rate of the process gas is regulated at 1000 PPM or less. In addition, the purge gas is discharged out of the valve body 2 through the purge gas discharging passage 23 so that the purge gas is regulated at 1000 PPM or less. If the purge gas is mixed in the process gas at an amount of 1000 PPM or more, the characteristics (concentration) of the process gas could be changed, and as a result, the performance of semiconductors to be manufactured might be influenced. The purge gas passages 22a, 22b, 22d, and 22e are used to supply the purge gas to prevent the process gas from leaking in the clearance 11. At the same time, the purge gas passage 22c is used to supply the purge gas for separating the chamber passage 24 and others placed above the passage 22c from bearings and others placed below the passage 22c.

When the purge gas is supplied from the purge gas passages 22a, 22b, 22d, and 22e to the clearance 11, the purge gas pushes the process gas back to the main passage 31, thereby preventing the process gas from leaking in the clearance 11 and also preventing the process gas from entering and clogging the clearance 11.

The clearance 11 between the valve body 2 and the valve member 3 contributes to avoid wear of contact portions and generation of wear powder to be caused by the repetition of metal contact of the metal portions as conventional technique. Therefore, wear and generation of wear powder due to the contact of the valve body 2 and the valve member 3 are unlikely to occur, so that the rotary switching valve 1 can have longer lifetime. In addition, it is preventable that the wear powder contaminates the chambers.

The chamber communication passage 24 and the vent communication passage 25 are formed at the midpoint between the purge gas passages 22a and 22b, from which the process gas and the purge gas at the same flow rate respectively are supplied, so that the leakage of the process gas in the clearance 11 can be prevented. Further, flow rate adjustment is facilitated since the passages 24 and 25 are placed in the middle position of the passages 22a and 22b. The chamber communication passage 24 and the vent communication passage 25 are also located at the midpoint between the purge gas passages 22d and 22e, so that the same effect as above can be obtained.

The purge gas passages 22a, 22b, 22d, and 22e are communicated with the insertion hole 21 through the purge gas annular passages 2g and 2h. Thereby, the purge gas can enter the clearance 11 via the purge gas annular passages 2g and 2h and spread widely. As a result, the process gas is prevented from leaking in the clearance 11.

When the process gas is to be discharged to an exhaust port, for example, in the case of the process gas being toxic, the supply of the process gas is stopped by closing a not-shown opening/closing valve. Subsequently, the cylindrical valve member 3 is rotated by 180 degrees to bring the process gas communication port 31b into communication with the vent communication passage 25 of the valve body 2. The process gas is thus discharged to the exhaust port.

The opening of the process gas communication port 31b has a central angle of about 60 degrees. As shown in FIG. 6B, the process gas communication port 31b has a fan-like shape in section, enabling the communication between the chamber communication passage 24 and the vent communication passage 25 even when the port 31b is in the halfway of switching from the chamber communication passage 24 to the vent communication passage 25. FIG. 6A shows a state where the process gas communication port 31b is connected to the chamber communication passage 24 to allow the process gas to flow in the chamber communication passage 24. FIG. 6C shows a state where the process gas communication port 31b is connected to the vent communication passage 25 to allow the process gas to flow in the vent communication passage 25.

As shown in FIGS. 6A to 6C, since the process gas communication port 31b has a fan-like shape, the port 31b is continuously communicated with the chamber communication passage 24 and the vent communication passage 25.

In the case where the process gas communication port 31b has almost the same distance with the communication passages, when the port 31b is at the middle position for the switching as shown in FIG. 6B, the open end of the port 31b could be closed by the inner wall 21a of the insertion hole 21.

If the open end of the port 31b is blocked by the inner wall 21a, the process gas is not allowed to flow anywhere and is liable to accumulate inside the main passage 31. Due to this accumulation of the process gas in the main passage 31, the process gas leaks in the clearance 11 surrounding the process gas supply port 31a.

On the other hand, the rotary switching valve 1 according to the first embodiment has the opening of the process gas communication port 31b having a fan-like shape with a central angle of about 60 degrees in section, so that the process gas communication port 31b is continuously communicated with at least one of the chamber communication passage 24 and the vent communication passage 25 even in the middle position for the switching as shown in FIG. 6B. Therefore, the process gas is unlikely to accumulate inside the main passage 31, thus preventing the leakage of the process gas out of the main passage 31.

Consequently, it is possible to prevent the process gas from leaking from the main passage 31 into the clearance 11 surrounding the process gas supply port 31a.

Control of a flow rate of the purge gas to be supplied at 1000 PPM or less relative to the process gas and a flow rate of the purge gas to be discharged from the vent communication passage 25 at 1,000 PPM or less is determined according to the results of two experiments described below.

Both the two experiments are performed to confirm increase and decrease of the concentration of a gas B by use of a mass spectrometer. Herein, the mass spectrometer is used because it has high precision and is easy to be handled. In the experiments, the gas B concentration is expressed in the unit, %, instead of PPM.

The two experiments are performed with use of a rotary switching valve formed with the clearance 11 having a distance of 50 μm between the valve body 2 and the cylindrical valve member <First Experiment>

A first experiment is explained below in detail. The first experiment is performed in order to ascertain the leakage amount of the process gas in the rotary switching valve 1.

Figure 2:
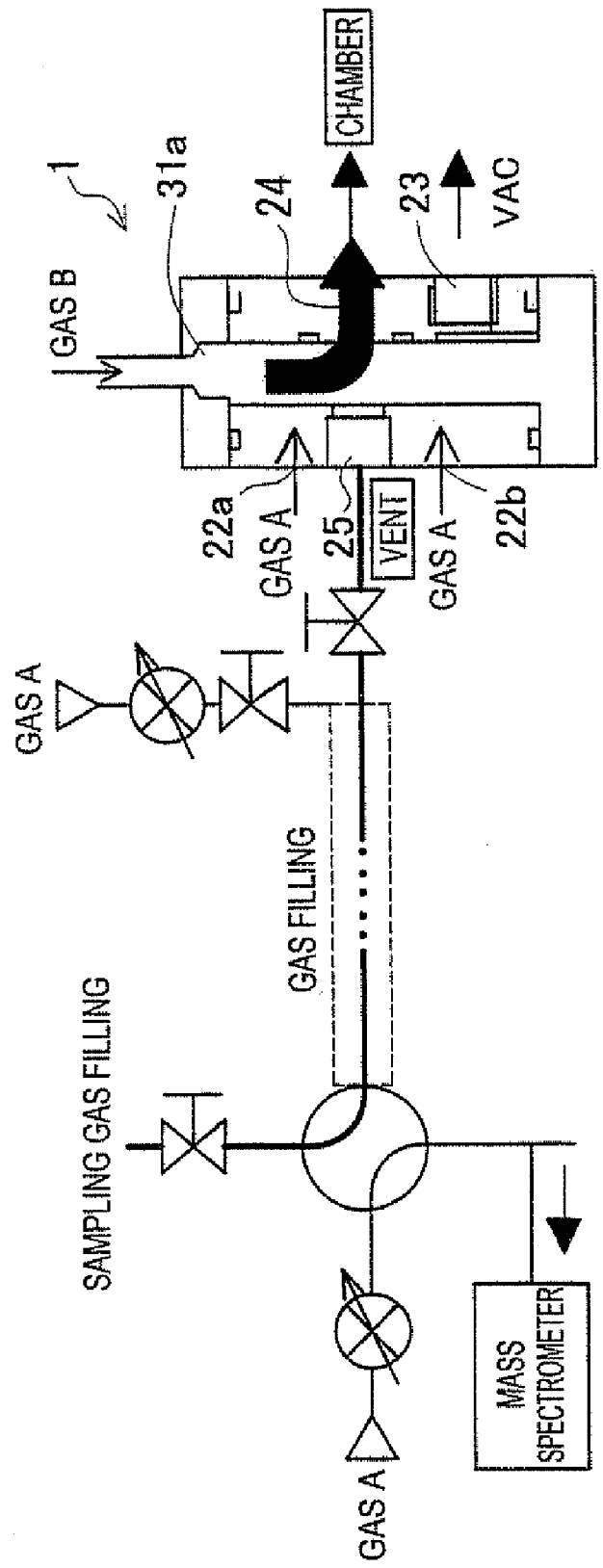
FIG. 2 is a diagram showing an analyzing method in a first experiment (I)
Figure 3:
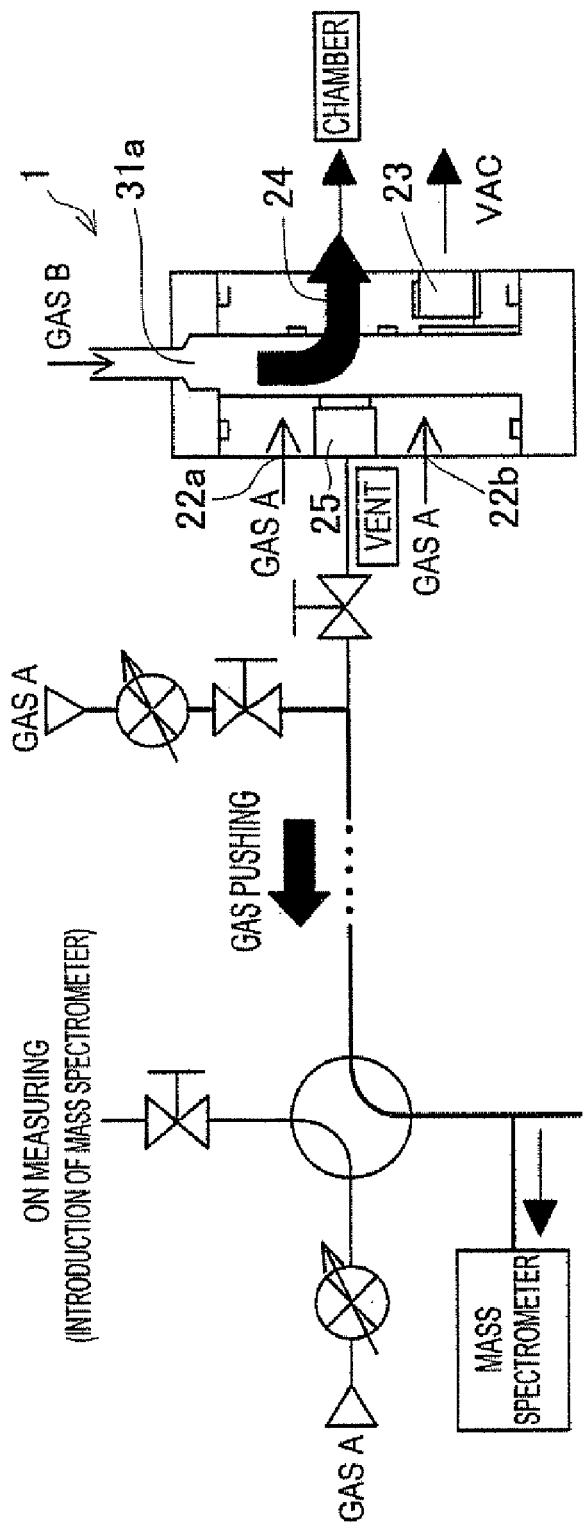
FIG. 3 is a diagram showing another analyzing method in the first experiment (II)
Figures 7A, 7B:
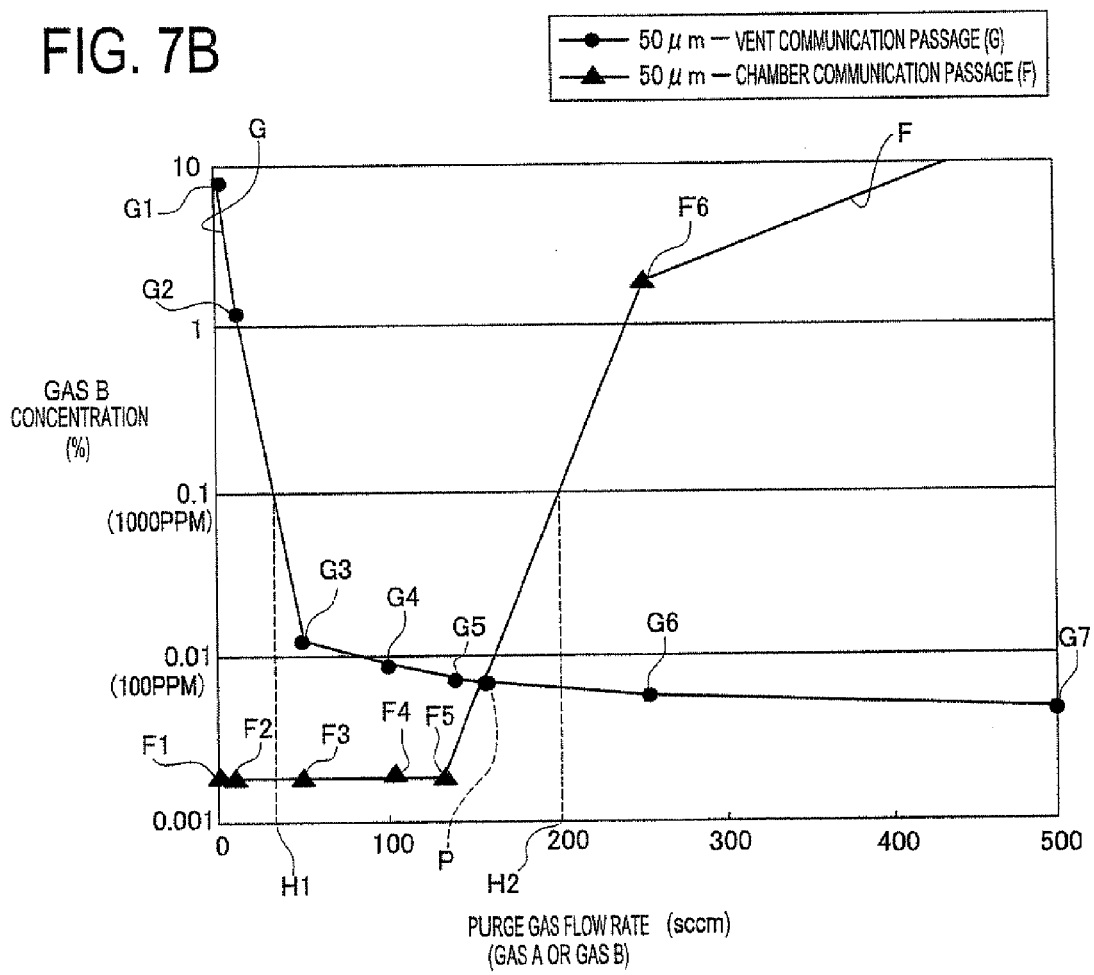
FIG. 7A is a table showing a test result of the first and second experiments (I)
FIG. 7B is a diagram showing a test result of the first and second experiments (II)

FIGS. 2 and 3 show methods of ascertaining the experiment. In the figures, the rotary switching valve 1 is depicted in a simplified manner. Specifically, only the purge gas passages 22a and 22b of the purge gas passages are illustrated. The experiment results are shown in FIGS. 7A and 7B. FIG. 7A shows a table of the gas B concentration and FIG. 7B is a graph of FIG. 7A. A longitudinal axis in FIG. 7B indicates the gas B concentration (%) in a logarithmic graph and a lateral axis indicates a flow rate (sccm) of a purge gas (gas A).

(I) As shown in FIG. 2, the rotary switching valve 1 is configured that the gas B instead of the process gas is supplied through the process gas supply port 31a and discharged through the chamber communication passage 24. Further, the gas A instead of the purge gas is supplied to the valve 1 through the purge gas passages 22a and 22b and discharged from the valve 1 through the purge gas discharging passage 23. At that time, the concentration of the gas B leaking in the vent communication passage 25 is measured. This measurement is made because if the gas B flows from the main passage 31 to the chamber communication passage 24 without leaking in the clearance 11, the gas B would not leak in the vent communication passage 25.

In the first experiment, the rotary switching valve includes the clearance 11 having a distance of 50 μm. Further, the flow rate of the gas A supplied from each of the purge gas passages 22a and 22b into the valve 1 is equal to each other. Therefore, in FIG. 7A, the flow rate of the gas A indicates the flow rate through either one of the purge gas passage 22a or the purge gas passage 22b. The total flow rate of the gas A in the valve 1 is therefore equivalent to two times of the flow rate of the gas A in FIG. 7A.

As indicated in a section (G1) in FIG. 7A, in a state of 0 sccm, i.e., while the gas A is not supplied, the concentration of the gas B is 8.580%.

(II) The flow rate of the gas A is successively increased. Simultaneously, the concentration of the gas B leaking in the vent communication passage 25 is measured. This measurement reveals that when the measured gas B concentration decreases, the leakage amount of the gas B decreases.

To be more specific, as shown in FIG. 7A, when the gas A is supplied at 10 sccm, the gas B concentration is 1.980% (G2). When the gas A is supplied at 50 sccm, the B gas concentration is 0.0133% (G3). When the gas A is supplied at 100 sccm, the gas B concentration is 0.0092% (G4). When the gas A is supplied at 125 sccm, the gas B concentration is 0.0076% (G5). When the gas A is supplied at 250 sccm, the gas B concentration is 0.0065% (G6). When the gas A is supplied at 500 sccm, the gas B concentration is 0.0064% (G7).

After the flow rate of the purge gas (gas A) exceeds about 30 sccm, the concentration of the gas B leaking out of the vent communication passage 25 is less than 0.1% (1000 PPM) even when the flow rate of the gas A is increased. The first experiment proves that after a line graph G crosses over a point H1, the gas B concentration stays less than 0.1% as shown in FIG. 7B.

<Second Experiment>

A second experiment will be explained below. The second experiment is made to ascertain the mixture ratio of the purge gas in the process gas in the rotary switching valve 1.

Figure 4:
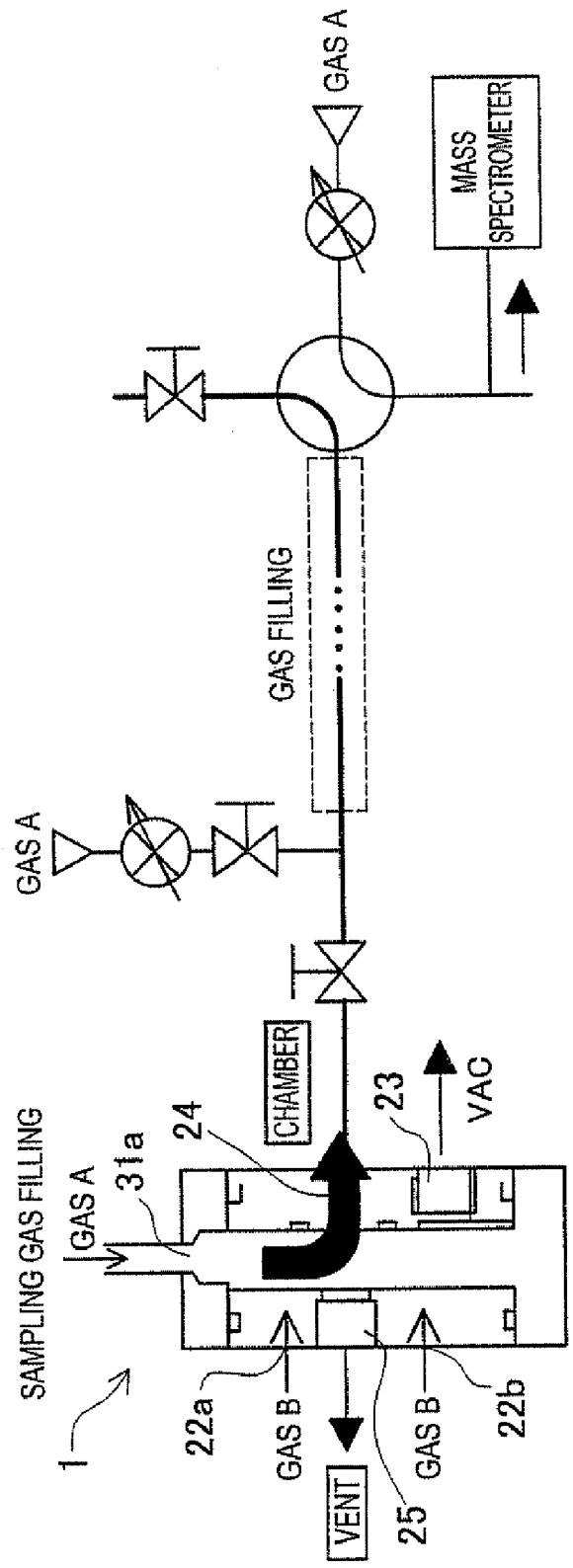
FIG. 4 is a diagram showing an analyzing method according to a second experiment (I)
Figure 5:
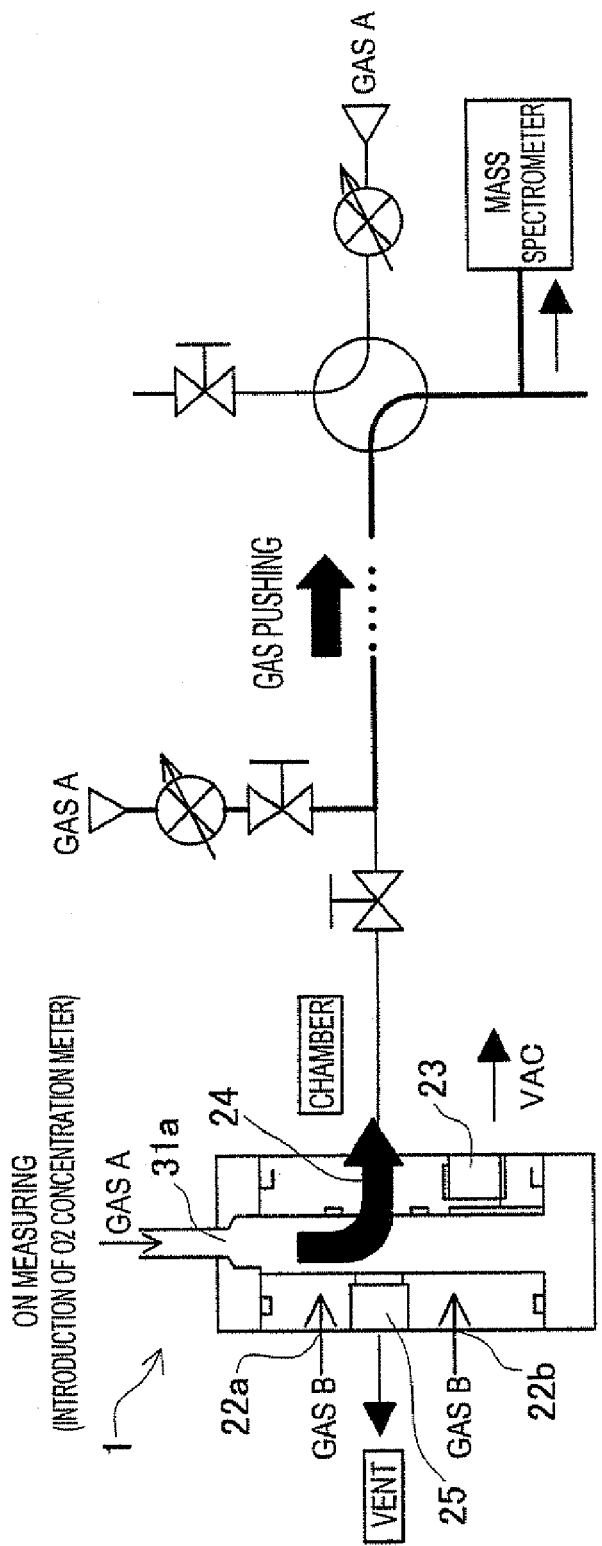
FIG. 5 is a diagram of another analyzing method according to the second experiment (II)

FIGS. 4 and 5 show the method of ascertaining in the experiment. In the figures, the rotary switching valve 1 is depicted in a simplified manner. Specifically, only the purge gas passages 22a and 22b of the purge gas passages are indicated. The experiment results are shown in FIGS. 7A and 7B. FIG. 7A shows the table of the gas B concentration and FIG. 7B is the graph of FIG. 7A. The longitudinal axis in FIG. 7B indicates the gas B concentration (%) in a logarithmic graph and the lateral axis indicates the flow rate (sccm) of the purge gas (gas B).

(I) As shown in FIG. 4, the rotary switching valve 1 is configured that the gas A is supplied through the process gas supply port 31a and discharged through the chamber communication passage 24. Further, the gas B instead of the purge gas is supplied to the valve 1 through the purge gas passages 22a and 22b and discharged from the valve 1 through the purge gas discharging passage 23. At that time, the concentration of the gas B mixed into the chamber communication passage 24 is measured. This measurement is made because, if the gas B does not leak in the clearance 11 and is not mixed into the gas A, the concentration of gas B in the gas A flowing out of the chamber communication passage 24 would not increase.

In the second experiment, the rotary switching valve includes the clearance 11 having a distance of 50 μm.

As indicated in a section (F1) in FIG. 7A, in a state of 0 sccm, i.e., while the gas B is not supplied in the valve 1 through the purge gas passages 22a and 22b, the gas B concentration is 0.0026%.

(II) The flow rate of the gas B is successively increased. The measurement is performed at that time to measure the concentration of the gas B which is mixed into the chamber communication passage 24. According to the measurement, when the gas B concentration has been gradually increased, it is determined that the mixture amount of the gas B is large. If this mixture amount of the gas B can be reduced, for example, it is possible to prevent the large amount of the purge gas from being mixed into the process gas. Therefore, it is also preventable that the purge gas enters into the process gas, which could result in a change in the characteristics (concentration) of the process gas and the performance of a semiconductor.

To be more specific, as shown in FIG. 7A, when the gas B is supplied at 10 sccm, the gas B concentration is 0.0022% (F2). When the gas B is supplied at 50 sccm, the gas B concentration is 0.0022% (F3). When the gas B is supplied at 100 sccm, the gas B concentration is 0.0032% (F4). When the gas B is supplied at 125 sccm, the gas B concentration is 0.0027% (F5). When the gas B is supplied at 250 sccm, the gas B concentration is 3.826% (F6). When the gas B is supplied at 500 sccm, the gas B concentration is 13.69% (F7).

The concentration of the gas B leaking out of the chamber communication passage 24 is less than 0.1% (1000 PPM) even when the flow rate of the purge gas (gas B) is reduced before the flow rate of the purge gas (gas B) exceeds about 200 sccm. The second experiment proves that the gas B concentration stays less than 0.1% until the line graph F crosses over the point H2 as shown in FIG. 7B.

The results of the above two experiments are examined referring to FIGS. 7A and 7B.

The gas B concentration in the first and second experiments is compared when the clearance 11 has a distance of 50 μm. The gas B concentration in the first experiment is that of the gas B leaking out of the vent communication passage 25. The gas B concentration in the second experiment is that of the gas B leaking out of the chamber communication passage 24. The gas B concentration measured by the mass spectrometer is highly precise and easy to be measured. By utilizing such the feature of the mass spectrometer, the applicant succeeded in measuring the leakage amount of the main fluid and the mixture amount of the purge gas by supplying the purge gas from the main passage or the purge gas passage.

The both measurement results are used to examine the flow rate of the purge gas at the flow rate that the gas B concentration is equal to or less than 1000 PPM (0.1% or less). At the same time, the flow rate of the purge gas is examined at 1000 PPM or more (0.1% or more) that the gas B does not leak in the clearance 11.

After the flow rate of the purge gas exceeds about 30 sccm, the concentration of the gas B leaking out of the vent communication passage 25 is less than 0.1% (1000 PPM) even when the flow rate of the purge gas is further increased in the first experiment. Until the line graph G crosses over the point H1 as shown in FIG. 7B, the gas B concentration stays less than 0.1% (1000 PPM).

On the other hand, before the flow rate of the purge gas exceeds about 200 sccm, the concentration of the gas B leaking out of the chamber communication passage 24 is less than 0.1% (1000 PPM) in the second experiment. Until the line graph F crosses over the point H2 as shown in FIG. 7B, the gas B concentration stays less than 0.1% (1000 PPM).

Consequently, the both measurement results prove that if the flow rate of the purge gas is within the range from H1 to H2 in FIG. 7B, the gas B concentration is equal to or less than 1,000 PPM (0.1%) when the clearance 11 has the distance of 50. In addition, the point P where the line graph G and the line graph F intersect expresses a shield gas flow rate, which is the most well-balanced flow rate.

When the flow rate of the purge gas is within the range from H1 to H2 in FIG. 7B, the process gas can be prevented from leaking in the clearance 11. Further, even when the purge gas mixes with the process gas, the mixing amount is not large enough to change the characteristics (concentration) of the process gas, so that the performance (concentration) of a semiconductor as a final mechanical product is not influenced.

Furthermore, according to a simulation of the above first and second experiments, it is confirmed that the most preferable configuration of the purge gas passages 22a and 22d is to form the passages 22a and 22d opening in a side wall surface of the valve body 2 at a distance of 150 mm or less from the horizontal line of the upper surface 3a of the cylindrical valve member 3.

When the purge gas passages 22a and 22d are formed at a distance of 150 mm or more from the horizontal line of the upper surface 3a of the cylindrical valve member 3, if the process gas enters the clearance 11 surrounding the process gas supply port 31a through the port 31a, it takes time until the purge gas reaches the port 31a and pushes back the process gas and therefore, a large amount of the purge gas is required for pushing back the process gas so that the process gas does not leak in the clearance 11. In such the case, a large amount of the purge gas could mix with the process gas and the characteristics (concentration) of the process gas could be changed, so that the performance of a semiconductor to be manufactured could be influenced.

Moreover, in the case that the purge gas passages 22a and 22d are formed at a distance of 150 mm or more from the horizontal line of the upper surface 3a of the cylindrical valve member 3, the size of the rotary switching valve 1 could be enlarged. Since the rotary switching valve 1 is used in a manufacturing line, space reduction is required.

Consequently, it is preferable that the purge gas passages 22a and 22d are formed opening in the side surface of the valve body 2 at the distance of 150 mm or less from the horizontal line of the upper surface 3a of the cylindrical valve member 3.

As described in detail above, the following effects can be expected according to the rotary switching valve 1 in the first embodiment.

(1) A rotary switching valve 1 comprising: a valve body 2 formed with a chamber communication passage 24 for flowing a process gas and a vent communication passage 25 for discharging a main fluid; and a cylindrical valve member 3 rotatably held in the valve body 2 and formed with a main passage 31 in which the main fluid flows, the cylindrical valve member 3 being rotated to switch the connection of the main passage 31 between the chamber communication passage 24 and the vent communication passage 25 wherein the rotary switching valve 1 further includes purge gas passages 22a, 22b, 22c, 22d, and 22e for flowing purge gas in a clearance 11 between the valve body 2 and the valve member 3, the purge gas being supplied to the clearance 11 to prevent the main fluid from leaking out of the main passage 31. Therefore, when the process gas flows through the main passage 31 in the valve member 3, for example, the purge gas flows through the clearance 11 between the valve body 2 and the valve member 3. Thereby, it can be prevented that the process gas leaks in the clearance between the valve body 2 and the valve member 3.

(2) The valve body 2 and the cylindrical valve member 3 are out of contact with each other by the clearance 11 provided between the valve body 2 and the valve member 3. Therefore, contact portions can avoid abrasion caused by the repetition of metal contact, thus elongating the lifetime of the rotary switching valve 1. Moreover, there is no abrasion powder generated.

(3) The main passage 31 formed in the valve member 3 is of a fan-like cross section. Therefore, the main passage 31 is continuously communicated with at least one of the vent communication passage 25 and the chamber communication passage 24, thus preventing accumulation of the main fluid in the valve member 3.

(4) The main passage 31 formed in the valve member 3 is communicated with both the chamber communication passage 24 and the vent communication passage 25 of the valve body 2 when the valve member is placed in a middle position for switching the connection of the main passage, so that the main passage 31 is continuously communicated with at least one of the chamber communication passage 24 and the vent communication passage 25, thus preventing accumulation of the process gas in the valve member 3.

(5) The purge gas is supplied in the clearance 11 through the purge gas annular passages 2g and 2h and widely spread. Thereby, the process gas is prevented from leaking in the clearance 11.

(6) Further, the flow rate of the purge gas is controlled so that the purge gas is mixed with the main fluid at 1000 PPM or less. Even when the purge gas mixes with the process gas, the flow rate of the purge gas is not large enough to change the characteristics (concentration) of the process gas, and therefore performance of a semiconductor is not influenced.

(7) The first experiment is conducted to make a graph showing a leakage amount of the main fluid and the second experiment is conducted to make a graph showing a mixing amount of the purge gas mixing with the main fluid when the purge gas amount is changed. The purge gas amount is determined based on an intersection where the graph of the leakage amount obtained by the first experiment and the graph of the mixture gas obtained by the second experiment are crossed. The purge gas amount is thus determined so that the mixing ratio of the flow rate of the purge gas mixing with the main fluid is controlled to 1000 PPM or less.

(8) In the first experiment, the gas A is supplied instead of the purge gas and the gas B is supplied instead of the main fluid and the concentration of the gas B discharged from the chamber communication passage is measured by use of a mass spectrometer. In the second experiment, the gas B is supplied instead of the purge gas and the gas A is supplied instead of the main fluid and the concentration of the gas B discharged from the chamber communication passage is measured by use of the mass spectrometer. From these experiments, the flow rate of the purge gas mixing with the main fluid is regulated at 1000 PPM or less.

Since the highly precise mass spectrometer is used in the experiments, reliable data can be obtained in advance and it becomes possible to regulate the mixing ratio of the purge gas mixing with the main fluid to 1000 PPM or less.

Second Embodiment

Figure 8:
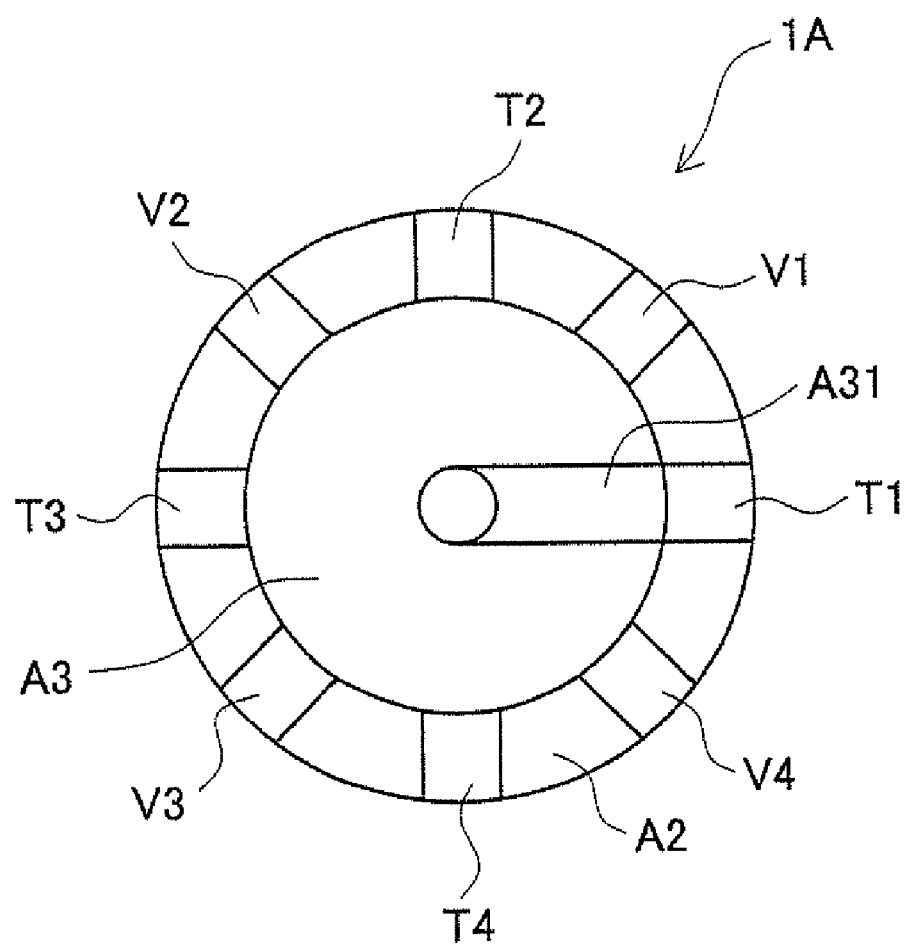
FIG. 8 is a sectional view of a valve body and a cylindrical valve member in a second embodiment.

The second embodiment of the present invention will be explained referring to FIG. 8. FIG. 8 is a cross sectional view of a cylindrical valve member A3 and a valve body A2 of a rotary switching valve 1A.

As shown in FIG. 8, eight communication passages are formed in the valve body A2, centering on the cylindrical valve member (hereinafter, simply referred as the valve member) A3. The 8 communication passages of the valve body A2 are chamber communication passages V1, V2, V3, and V4 and vent communication passages T1, T2, T3, and T4. Other portions are almost the same with the first embodiment and therefore explanation thereof is not repeated.

In the second embodiment, a high-speed motor is used to allow the valve to rotate by 360 degrees, so that a main passage A31 of the valve member A3 can be brought into communication with the eight communication passages.

The valve member A3 is allowed to rotate by 360 degrees and thus the main passage A31 is brought into communication with the eight communication passages. As a result, the plural communication passages can be selectively connected at high speed.

In the first embodiment, the cylindrical valve member rotates by 180 degrees to bring the chamber communication passage into communication with the vent communication passage. When comparing the rotary switching valve 1 of the first embodiment and the rotary switching valve 1A of the second embodiment, the cylindrical valve member 3 of the first embodiment is connected to the vent communication passage from the chamber communication passage and then switched to be connected to the chamber communication passage form the vent communication passage. Thus, the valve member 3 rotates by 180 degrees twice, requiring the rotation movement of total of 360 degrees.

On the other hand, in the second embodiment, for bringing the chamber communication passage V2 into communication from the chamber communication passage V1, the cylindrical valve member A3 rotates only by 90 degrees to branch off the main passage A31. Therefore, in the rotary switching valve 1A of the second embodiment, switching of the communication passages can be achieved with one forth of the time required in the first embodiment.

As described above, the rotary switching valve 1A in the second embodiment has the following advantages.

As the cylindrical valve member A3 is rotatable by 360 degrees, the main passage A31 of the valve member A3 is allowed to be brought into communication with the eight communication passages. Thereby, the communication passages can be selectively connected to the main passage at high speed. Further, the communication passages can be multiply switched.

In the rotary switching valve 1A in the second embodiment, the cylindrical valve member A3 does not need to rotate by 180 degrees twice and the communication passage can be branched off at one forth period compared to the conventional technique.

Third Embodiment

In the third embodiment, a rotary switching valve 1 is adopted to a system having a vaporizer 61 mounted in a semiconductor manufacturing device. In the system including the vaporizer 61, deposition treatment is conducted on a wafer surface by vaporizing liquid material by the vaporizer 61. For vaporizing the liquid material, the temperature in the system has to be maintained at 250° C. or more. Otherwise, the liquid material could be solidified. Therefore, a gas has to be maintained at 250° C. or more.

Figure 10:
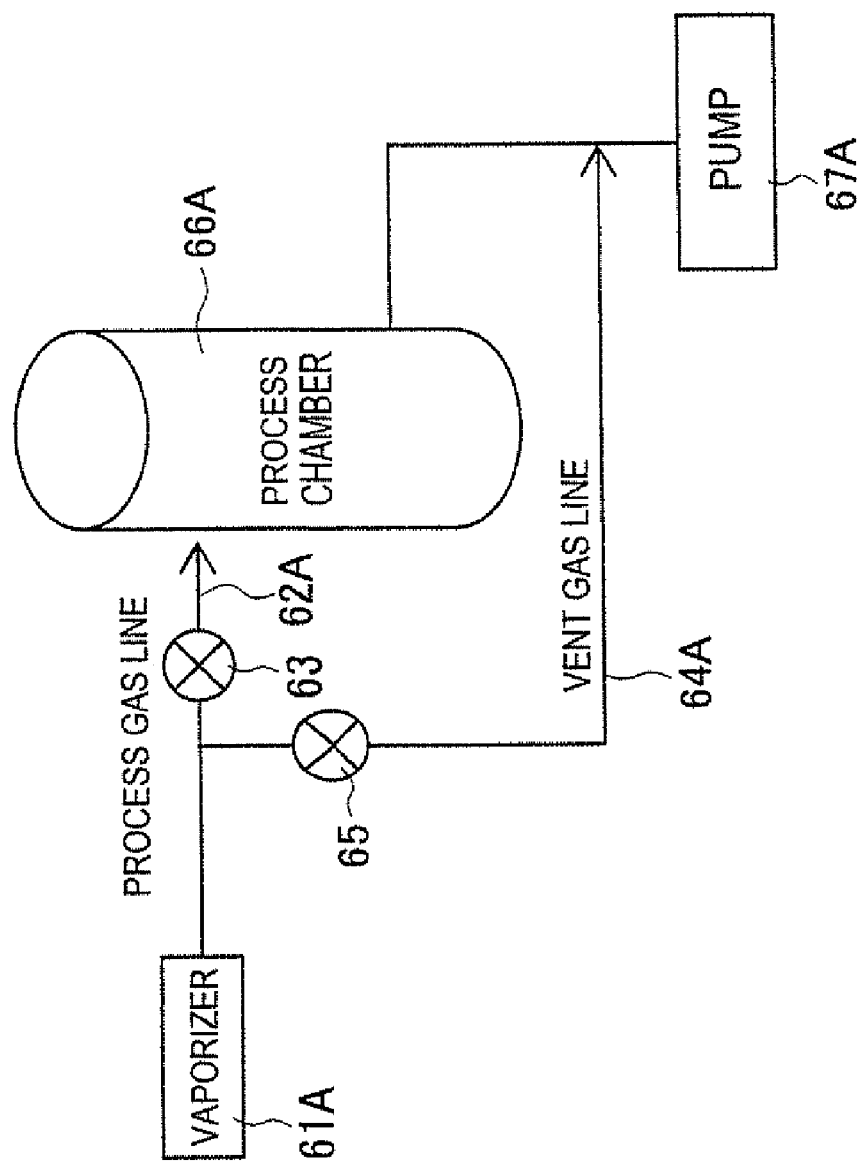
FIG. 10 is a structural view of a system in which a vaporizer is mounted in a conventional semiconductor manufacturing device.

In the conventional technique, as shown in FIG. 10, a diaphragm valve 63 is provided on a process gas line 62A and a diaphragm valve 65 is provided on a vent gas line 64A, respectively to switch the supply of gas to a process chamber 66A and a pump 67A. FIG. 10 exemplifies a case that the gas is discharged by use of a single pump, but a special pump may be provided on the vent gas line 64A.

In the device shown in FIG. 10, the temperature declines easily in portions such as diaphragms and sealing portions of the diaphragm valves 63 and 65 provided on the process gas line 62A and the vent gas line 64A. Therefore, even if an outer body or a valve body of the diaphragm valve is heated, the temperature is hardly increased, so that product generated by solidification of the liquid material could be easily attached to the diaphragm and the sealing portion. Further, the product could be easily attached due to such as collision of the gas to the diaphragm, the accumulation of the gas in a confined space, and the pressure increase.

Figure 11:
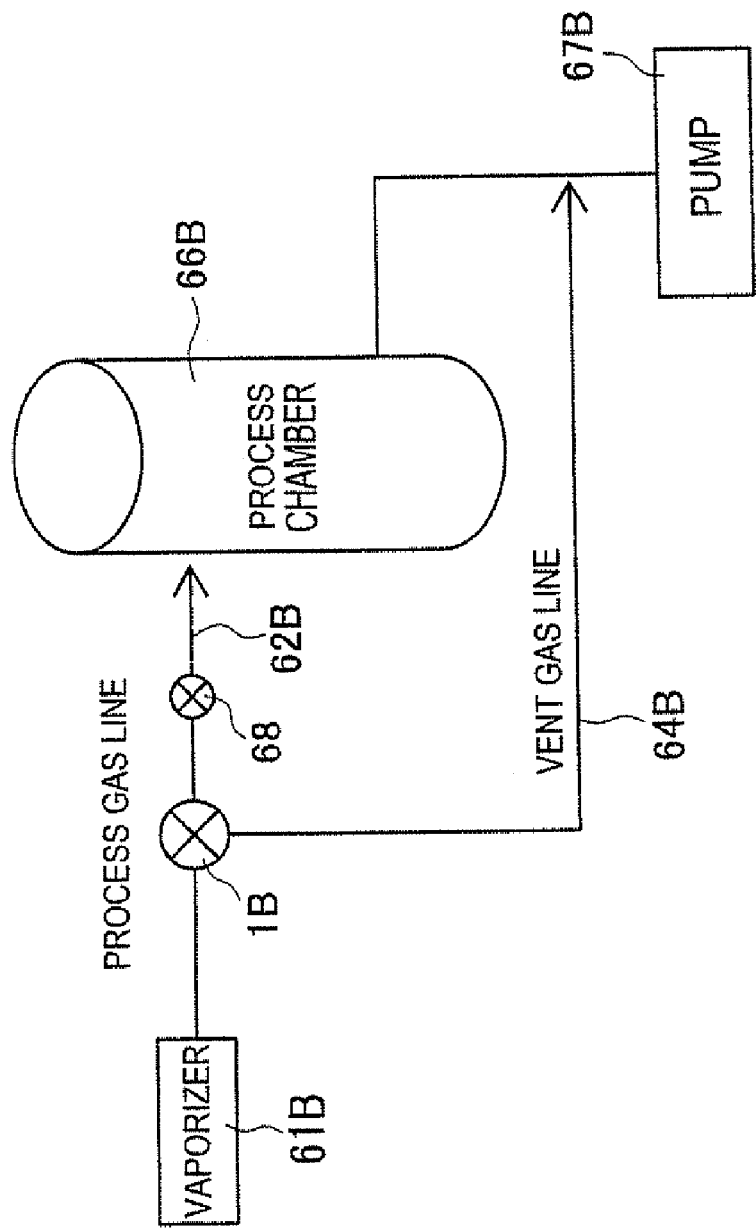
FIG. 11 is a structural view of a system in which a vaporizer is mounted in a semiconductor manufacturing device.

FIG. 11 shows a system in which the rotary switching valve 1B and a vaporizer 61B are provided in a semiconductor manufacturing device. In the system in FIG. 11, a rotary switching valve 1B is placed on a branch point of a process gas line 62B and a vent gas line 64B. The configuration of the rotary switching valve 1B is similar to that of the rotary switching valve 1 in the first embodiment, so the detailed explanation is not repeated. On the process gas line 62B on which the rotary switching valve 1B is placed, a gas blocking valve 68 is mounted.

According to the device in FIG. 11, the rotary switching valve 1B is adopted instead of the diaphragm valves 63 and 65 of the prior art to supply N2 purge gas at high temperature to the clearance 11, so that the temperature of the liquid material hardly becomes 250° C. or less, preventing solidification of the liquid material. Further, mechanical contact does not occur because of the clearance 11, restricting particles. In addition, durability of the valve can be enhanced. Furthermore, high-speed switching is realized to shorten the treatment period and to enhance the productivity. Finally, the flow rate characteristics can be also enhanced because there is no confined space like the diaphragm valve.

To stop supplying the process gas, a gas blocking valve 68 is required, but the valve 68 has only to be operated as necessary, i.e., before the process starts and after the process is terminated while the valve 68 is continuously in a valve-open state in the deposition treatment. Therefore, the rotary switching valve in the present embodiment can avoid such the problems that the conventional diaphragm valve of FIG. 10 has. For a gas blocking valve, not only the diaphragm valve but also other valves such as a bellows-type valve and a ball valve having good flow rate characteristics may be used.

Forth Embodiment

In the forth embodiment, rotary switching valves 1C and 1D are used in a system adopting the ALD Process (see Patent Literatures 2 and 3) in a semiconductor manufacturing device. The ALD process is a method for alternatively and consecutively supplying the gas A and the gas B to the process chamber.

Figure 12:
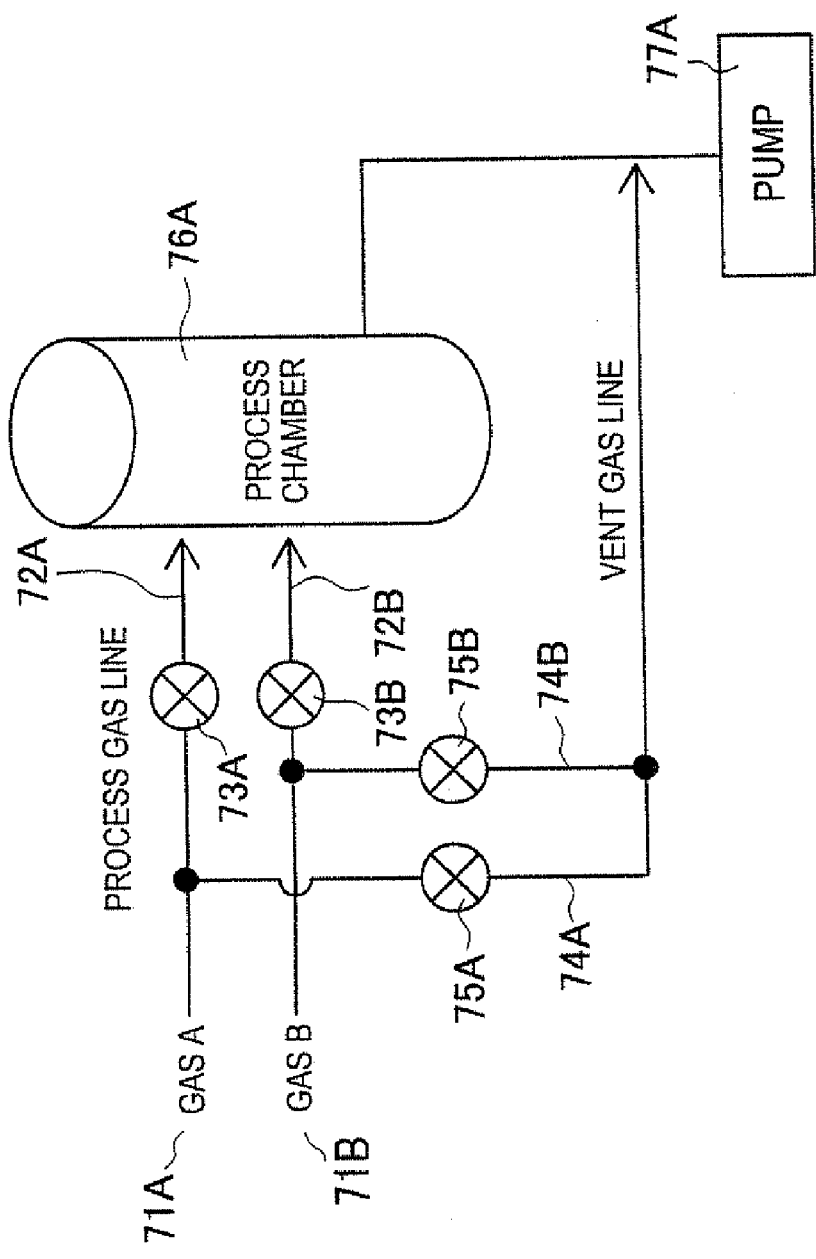
FIG. 12 is a structural view of a system of ALD method in a conventional semiconductor manufacturing device.

FIG. 12 shows a conventional system adopting the ALD process. As shown in FIG. 12, gas 71A as the gas A flows branching off to a process gas line 72A and a vent gas line 74A. The process gas line 72A is provided with a diaphragm valve 73A and the vent gas line 74A is provided with a diaphragm valve 75A. Further, gas 71B as the gas B branches off to a process gas line 72B and a vent gas line 74B. The process gas line 72B is provided with a diaphragm valve 73B and the vent gas line 74B is provided with a diaphragm valve 75B. The process gas lines 72A and 72B are connected to a process chamber 76A to supply the gas 71A and 71B to a pump 77A. The vent gas lines 74A and 74B are directly connected to the pump 77A to supply the gas 71A and 71B. FIG. 12 shows an example of applying a single pump, but alternately, a special pump for the vent gas line 74 may be provided.

In the ALD process, the valve opening/closing action has to be repeated for several tens to several hundreds of times in a couple of minutes until the desired layer thickness is obtained. Therefore, in the system shown in FIG. 12, the diaphragm valves 73A, 73B, 75A, and 75B perform the valve opening/closing action for several tens to several hundreds of times in a couple of minutes. In a diaphragm valve, a sealing portion and a diaphragm have to be mechanically contacted, but due to this contact relation, such problems occur that the sealing portion and the diaphragm may be scratched, deteriorating the durability and generating particles.

Figure 13:
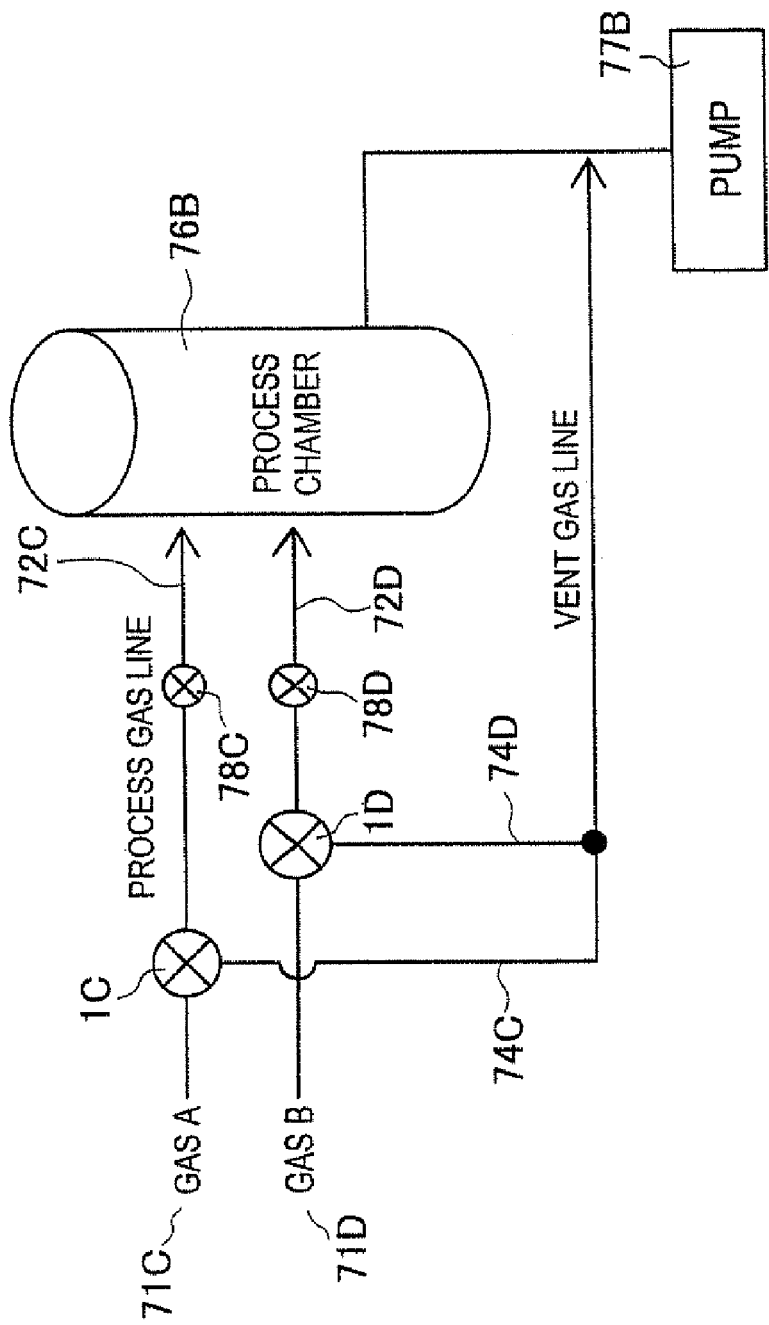
FIG. 13 is a structural view of a system of ALD method in a semiconductor manufacturing device.

FIG. 13 shows a system of the ALD process adopted in the rotary switching valve 1. In the system shown in FIG. 13, the rotary switching valve 1C is provided on a branching point of a process gas line 72C and a vent gas line 74C and a rotary switching valve 1D is provided on a branching point of a process gas line 72D and a vent gas line 74D. The configuration of the rotary switching valves 1C and 1D is similar to the rotary switching valve 1 and therefore the explanation will not be repeated. On the process gas line 72C provided with the rotary switching valve 1C, a gas blocking valve 78C is provided. On the process gas line 72D provided with the rotary switching valve 1D, a gas blocking valve 78D is provided.

According to the system in FIG. 13, the rotary switching valves 1C and 1D are applied instead of the diaphragm valves 73A, 73B, 75A, and 75B to form the clearance 11, so that mechanical contacts can be avoided at the branching points and scratches can be prevented, thus enhancing the durability of the valve. Because of the clearance 11, the sealing portion and the diaphragm are not contacted, restricting occurrence of particles. Further, the clearance 11 is purged with N2 purge gas at high temperature, so that solidification of the liquid is prevented. In addition, the excellent flow rate characteristics can be achieved since there is no confined space like the diaphragm valve.

To stop supplying the process gas, gas blocking valves 78C and 78D are required, but the number of times to operate the valves is saved because the valves 78C and 78D are continuously in a valve-opening state while the deposition treatment is performed and the valves 78C and 78D are only to be closed when necessary, for instance, before the start of the process and after the termination of the process. Therefore, there is no problem which has occurred in the diaphragm valve of FIG. 12.

The present invention may be embodied in other specific forms without departing from the essential characteristics thereof.

For instance, in the first embodiment, nitrogen gas, argon gas, and others may be applied as gas A. As gas B, oxygen gas, hydrogen gas, propane gas, and others may be applied.

In the first embodiment, the purge gas annular passages 2g and 2h are annularly formed in the valve body 2. Alternately, the passages may be annularly formed in the cylindrical valve member 3 and the same effect can be obtained.

In the second embodiment, the process gas communication port shown in FIG. 8 is shaped to correspond to the chamber communication port and a vent communication port as similar to the conventional technique. However, the process gas communication port 31b may be of a fan-like shape like the first embodiment. When the process gas communication port 31b is shaped like a fan, the inclination degree of the opening has to be designed so that the opening is continuously in a closed state. For example, the inclination degree may be less than 60 degrees, such as 45 degrees or 30 degrees.

The rotary switching valve in the second embodiment is able to rotate by 360 degrees, and therefore the number of the passages to be provided in the valve body A2 may be other than eight, for example four or six.

Figure 9:
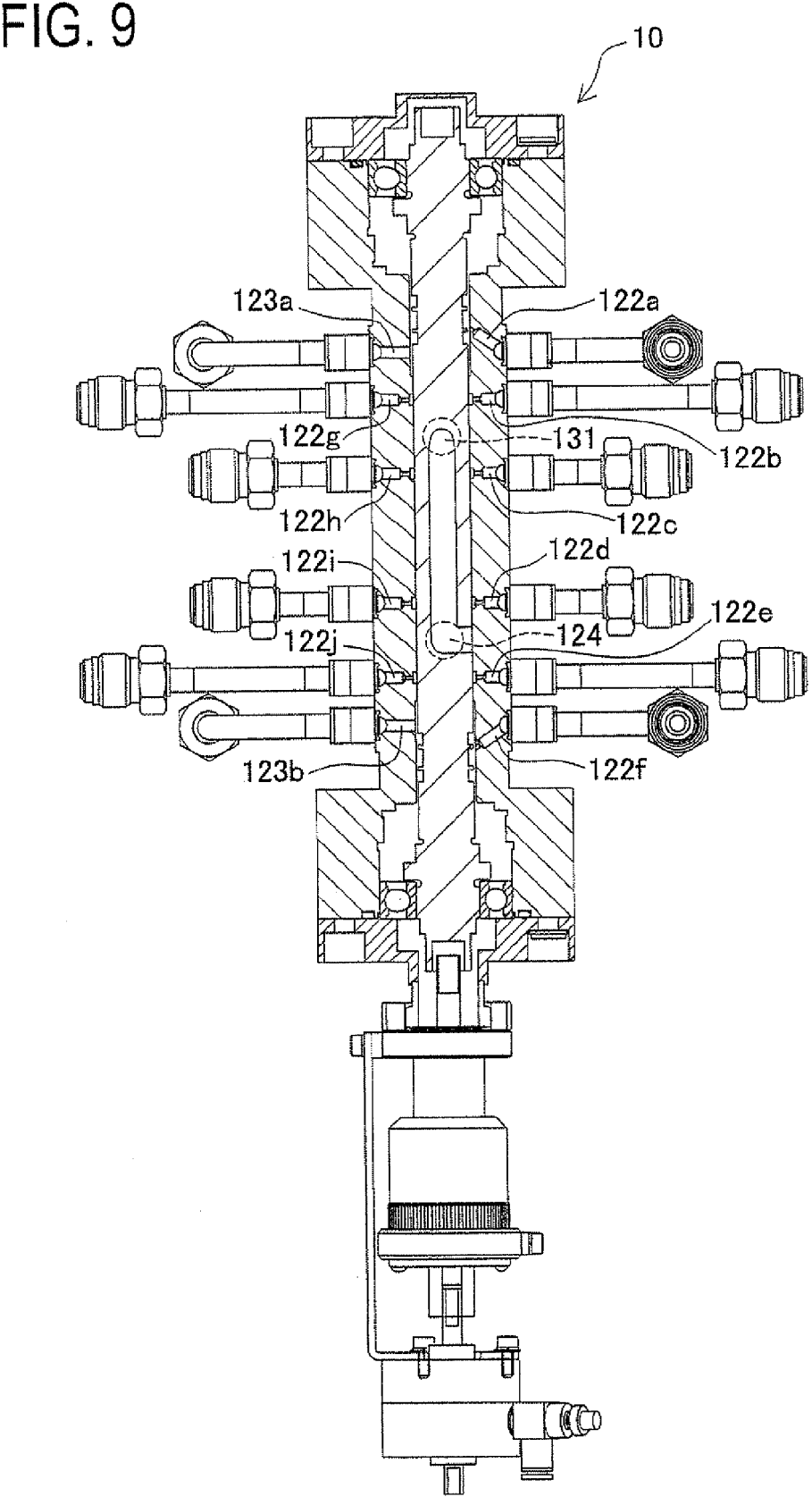
FIG. 9 is an externally partial sectional view of a rotary switching valve formed with five or more purge gas passages.

Further, instead of the five purge gas passages 22a, 22b, 22c, 22d, and 22e of the rotary switching valve 1 in FIG. 1, a rotary switching valve 100 as shown in FIG. 9 may be applied. The number of the purge gas passages is further increased to more than five in the rotary switching valve 100. As shown in FIG. 9, ten purge gas passages 122a to 122j are formed in the valve 100. The valve is further formed with purge gas discharging passages 123a and 123b.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

1 Rotary switching valve
11 Clearance
2 Valve body
21 Insertion hole
22a, 22b, 22d, 22e Purge gas passage
23 urge gas discharging passage
24 Chamber communication passage
25 Vent communication passage
3 Cylindrical valve member
31 Main passage
31a Process gas supply port
31b Process gas communication port
4 Rotation introduction member
5 Rotary actuator

The invention claimed is:

1. A rotary switching valve comprising:
a valve body formed with a chamber communication passage for flowing a main fluid and a vent communication passage for discharging the main fluid, the chamber communication passage and the vent communication passage being placed on facing side surfaces of the valve body, respectively;
a cylindrical valve member rotatably held in the valve body and formed with a main passage for flowing the main fluid, the main passage having a process gas supply port formed on one end surface of the valve body, the cylindrical valve member being rotated to switch a connection of the main passage between the chamber communication passage and the vent communication passage; and
a purge gas passage for passing purge gas in a clearance between the valve body and the cylindrical valve member, the purge gas passage including two purge gas passages, one of the two purge gas passages being positioned in between one end surface of the valve body and the chamber communication passage in an axial direction, the clearance being configured to receive the purge gas to prevent the main fluid from leaking out of the main passage;
wherein
the chamber communication passage and the vent communication passage are formed at a midpoint of the two purge gas passages.

2. The rotary switching valve according to claim 1, wherein the valve body and the cylindrical valve member are out of contact with each other by the clearance provided between the valve body and the cylindrical valve member.

3. The rotary switching valve according to claim 1, wherein the main passage formed in the cylindrical valve member is of a fan-like cross section.

4. The rotary switching valve according to claim 3, wherein the main passage formed in the cylindrical valve member is communicated with both the chamber communication passage and the vent communication passage when the valve member is placed in a middle position for switching the connection of the main passage.

5. The rotary switching valve according to claim 1, wherein the main passage formed in the cylindrical valve member is communicated with both the chamber communication passage and the vent communication passage when the valve member is placed in a middle position for switching the connection of the main passage.

6. The rotary switching valve according to claim 1, wherein the purge gas passage is communicated with a plurality of purge gas annular passages formed between the valve body and the cylindrical valve member, and
the chamber communication passage and the vent communication passage are formed in a position between the purge gas annular passages.

7. The rotary switching valve according to claim 1 wherein a flow rate of the purge gas is used so that a mixing ratio of the purge gas into the main fluid is 1000 PPM or less.

8. The rotary switching valve according to claim 7, wherein a first experiment is conducted to make a graph showing leakage amount of the main fluid when the flow rate of the purge gas is changed and a second experiment to make a graph showing a mixing ratio of the purge gas mixing into the main fluid when the flow rate of the purge gas is changed, and
the flow rate of the purge gas is determined based on the graph of the leakage amount made by the first experiment and the graph of the mixing amount made by the second experiment.

9. The rotary switching valve according to claim 8, wherein the first experiment is conducted in a manner that gas A is supplied to the purge gas passage, gas B is supplied to the main passage, and concentration of the gas B discharged from the vent communication passage is measured by a mass spectrometer, and
the second experiment is conducted in a manner that the gas B is supplied to the purge gas passage, the gas A is supplied to the main passage, and concentration of the gas B discharged from the chamber communication passage is measured by the mass spectrometer.

10. The rotary switching valve according to claim 1, further comprising:
a purge gas discharging passage for discharging the purge gas, the purge gas discharging passage being placed below the other purge gas passage.

* * * * *